United States Patent Office 3,345,406
Patented Oct. 3, 1967

3,345,406
CATALYTIC OXIDATION OF OLEFINS
Bernard Patrick Whim and Gordon Cheyne Fettis, Widnes, England, assignors to Imperial Chemical Industries Limited, London, England, a corporation of Great Britain
No Drawing. Filed Dec. 26, 1963, Ser. No. 333,754
Claims priority, application Great Britain, Mar. 15, 1963, 10,353/63
11 Claims. (Cl. 260—533)

This invention relates to an oxidation process for the manufacture of unsaturated aldehydes and/or unsaturated carboxylic acids from olefins, and more particularly to a catalytic vapour-phase oxidation process whereby an alkenal and/or an alkenoic acid is made by interaction of an alkene and oxygen.

According to the present invention there is provided a process for the manufacture of unsaturated aldehydes and/or unsaturated carboxylic acids which comprises contacting a mixture of an olefin and oxygen at elevated temperature with a catalyst containing manganese, molybdenum, tellurium, and oxygen.

In this process the catalyst specified produces a useful conversion of the olefin to the desired products without great loss of materials through complete oxidation of the olefin to carbon dioxide and water.

The chemical structure of the catalysts is not clear, but it appears that the manganese, molybdenum and tellurium may be present either as free oxides or in some combined form. The catalyst may be made for example by mixing aqueous solutions or suspensions of a manganese salt, a molybdate and tellurium oxide or telluric acid or a tellurate and then evaporating the mixture to dryness and igniting it. It is preferred to use a manganese salt, for example the nitrate, which is converted to the oxide by ignition in air or oxygen. Likewise, it is preferred that the molybdate should be such that it can lose its cation on ignition; the ammonium salt is particularly useful in this respect. Alternatively the catalyst may be prepared by thoroughly mixing the oxides.

The proportions of manganese, tellurium and molybdenum may be varied and selected by trial so as to achieve the optimum combination of physical and catalytic properties for the particular olefin and process conditions to be employed.

The catalyst may be in finely divided form or may be used as granules or pellets, and may if desired be deposited upon conventional support materials or mixed with inert solids. The mass or catalyst may be static in use, or may be employed using fluidised bed techniques.

The olefin may be a substantially pure material or a hydrocarbon fraction rich in the desired olefin, as may be obtained for example in petroleum cracking or refining processes. The process of the present invention is particularly efficient when the olefin is isobutene but other olefins may be used, for example propene.

Pure oxygen may be used, but air or other gas mixtures containing free oxygen may also be used.

The mixture of olefin and oxygen may be diluted with, for example, nitrogen, steam or a mixture thereof.

The proportions of oxygen and olefin in the mixture to be contacted with the catalyst may be varied to suit the particular olefin and reaction temperature to be employed. Suitable mixtures are those containing from 1 to 10 parts by volume of oxygen for each part by volume of olefin. Within this range we prefer to use at least 2 parts by volume of oxygen for each part by volume of olefin; when such mixtures are used the activity and selectivity of the catalyst are maintained over longer periods of continuous operation than when lower proportions of oxygen are used. We especially prefer to use reactions mixtures containing from 4 to 10 parts by volume of oxygen for each part by volume of olefin.

The benefits of the extended life-time of the catalyst may still be obtained when the proportion of oxygen in the reaction mixture is greater than 10 parts by volume of oxygen for each part by volume of olefin. In practice, however, an upper limit to the proportion of oxygen is usually set by considerations of inflammatory properties and/or economics, taking into account such factors as thet desired output per unit volume of catalyst and the relative difficulty of recovery of the desired products when these are diluted to too great an extent by air or other diluents.

The composition of the feed gas may be adjusted as desired so as to avoid inflammability or explosive properties.

Suitable temperatures at which the mixture of the olefin and oxygen may be contacted with the catalyst are those in the range between about 300° C. and 600° C. The optimum temperature in any instance will depend upon such factors as the particular olefin and contact time employed.

The mixture of olefin and oxygen may be passed over the catalyst in a reactor vessel provided with appropriate heating and/or cooling means to maintain the catalyst in the reaction zone at the desired temperature, while making due allowance for heat liberated during reaction. It is usually convenient to operate the process with the mixture of olefin and oxygen at substantially atmospheric pressure but higher or lower pressures may be used if desired.

The rate of flow of the mixture of olefin and oxygen is usually such as to give a contact time with the catalyst of between 0.5 and 10 seconds.

The unsaturated aldehyde and/or acid (for example methacrolein and/or methacrylic acid) can be isolated from the gas emerging from the catalyst by conventional means, for example by condensation, scrubbing with water, fractional distillation and combination of such techniques. Unreacted olefin remaining after extraction of the desired products can, if desired, be recycled to the gas mixture fed into the catalyst; the diluent can, if economically appropriate, be recycled also. Methacrolein so obtained can be used for conversion to methacrylic acid by further oxidation, and the methacrylic acid can be converted into esters. The methacrolein, methacrylic acid, methacrylic esters and corresponding compound derived from other olefins, can be used for the manufacture of a wide variety of polymers and copolymers of industrial value.

The invention is illustrated but not limited by the following examples. The contact time in each example has been calculated on the basis of the gas flow-rate at 25° C. and 760 mm. Hg. Yields are calculated on a molar basis.

Example 1

177.6 g. ammonium molybdate were dissolved in 200 ml. water and 83 ml. ammonia (s.g. 0.88) were added at 60° C. 288 g. manganese nitrate hexahydrate were dissolved in 288 ml. water and, after heating to 60° C., this solution was added slowly with stirring to the ammonium molybdate solution, the mixture being maintained at 60° C. during the addition.

When the addition of the manganese nitrate solution was complete the mixture was stirred for 15 minutes and left standing for 20 hours. The precipitate of manganese molybdate was collected by filtration, washed with water, mixed with 159.2 g. tellurium oxide together with sufficient water to make a thin paste, and ball-milled for 20 hours. The mixture was dried at 120° C. for 24 hours and heated in a purge of air at 400° C. for 4½ hours. The catalyst was graded to 14–36 mesh B.S.S. before use.

A mixture containing 10.6% by volume of propene, 52.1% by volume of air, and 37.3% by volume of steam was passed over a portion of the catalyst prepared as described above, the catalyst being mixed with four times its own volume of 8–12 mesh particles of "Pyrex" glass and contained in a 1 inch diameter "Pyrex" glass reaction tube. The contact time, calculated from the volume of the catalyst, was 5 seconds. The reaction temperature was 525° C. 15% of the propene fed was converted to acrolein and the yield of acrolein based on propene consumed was 27%.

Example 2

The catalyst prepared as described in Example 1, mixed with four times its volume of glass particles, was used to carry out the oxidation of propene under the same conditions as in Example 1 except that the reaction temperature was 446° C. 4.5% of the propene fed was converted into acrolein and 2.0% of the propene fed was converted into acrylic acid. The total yield of acrolein and acrylic acid, based on propene consumed, was almost quantitative.

Example 3

A mixture containing 2.0% by volume of isobutene and 98.0% by volume of air was passed over a catalyst prepared as described in Example 1, the catalyst being mixed with four times its volume of glass particles. The reaction temperature was 478° C. and the contact time, calculated from the volume of the catalyst, was 1.2 seconds. 61% of the isobutene fed was converted into methacrolein. The yield of methacrolein based on isobutene consumed was 70%.

Example 4

A mixture containing 1.7% by volume of isobutene, 83.3% by volume of air and 15.0% by volume of steam was passed over a catalyst prepared as described in Example 1, the catalyst being mixed with four times its own volume of glass particles. The reaction temperature was 502° C. and the contact time was 1.2 seconds. The isobutene fed was completely consumed. The yield of methacrolein was 72%.

Example 5

A mixture containing 10% by volume of isobutene, 10% by volume of oxygen and 80% by volume of nitrogen was passed over a catalyst prepared as described in Example 1. The reaction temperature was 537° C. and the contact time was 1.5 seconds. 42% of the isobutene fed was converted into methacrolein. The yield of methacrolein based on isobutene consumed was 83%.

Example 6

88.3 grams of ammonium molybdate were dissolved in 300 ml. water, 141 grams of manganese nitrate were disolved in 150 ml. water and 78.8 grams of tellurium dioxide were dissolved in 500 ml. concentrated nitric acid. These solutions were mixed and the equivalent of 80 grams of silica was added in the form of a dialysed solution of "Syton P" ("Syton P" is a trade name). The mixture was evaporated to dryness and the residue was dried, heated, graded and mixed with glass particles as described in Example 1.

A mixture consisting of 2.1% by volume of isobutene and 97.9% air was passed over a portion of the catalyst at 444° C. The contact time, calculated from the volume of catalyst, was 1.2 seconds. 53% of the isobutene fed was converted into methacrolein and the yield of methacrolein, based on isobutene consumed, was 53%.

By way of comparison, a catalyst was prepared in the same way except that the tellurium dioxide was omitted. When this catalyst was tested under the same conditions less than 1% of the isobutene fed was converted into methacrolein.

Example 7

53.2 grams of tellurium dioxide, 28.9 grams of manganese dioxide and 47.9 grams of molybdenum trioxide were slurried together with 50 ml. water and the mixture was ball-milled for 14 hours. The mixture was then evaporated to dryness and the residue was dried, heated, graded and mixed with glass particles as described in Example 1.

A mixture consisting of 2.0% by volume of isobutene and 98.0% by volume of air was passed over a portion of the catalyst at 473° C. The contact time, calculated from the volume of catalyst, was 1.2 seconds. 46% of the isobutene fed was converted into methacrolein and the yield of methacrolein, based on isobutene consumed, was 69%.

Example 8

Manganese molybdate was prepared as described in Example 1, except that the quantities were halved. The manganese molybdate was slurried with 144 grams of molybdenum trioxide, 80 grams of tellurium dioxide and 150 ml. water, the mixture was ball-milled and the residue was dried, heated, graded and mixed with glass particles as described in Example 1.

A mixture consisting of 2.1% isobutene and 97.9% air was passed over a portion of the catalyst at 436° C. The contact time, calculated from the volume of catalyst, was 1.2 seconds. 70% of the isobutene fed was converted into methacrolein and the yield of methacrolein, based on isobutene consumed, was 72%.

Example 9

Manganese molybdate was prepared as described in Example 8. The manganese molybdate was slurried with 159.6 grams of tellurium dioxide and 35 ml. water, the mixture was ball-milled and the residue was dried, heated, graded and mixed with glass particles, as described in Example 1.

A mixture consisting of 2.2% isobutene and 97.8% air was passed over a portion of the catalyst at 391° C. The contact time, calculated from the volume of catalyst, was 1.2 seconds. 64% of the isobutene fed was converted into methacrolein and the yield of methacrolein, based on isobutene consumed, was 64%.

What we claim is:

1. In a process for the manufacture of a compound selected from the group consisting of acrolein, acrylic acid and methacrolein by interacting oxygen and an olefin selected from the group consisting of propene and isobutene in the vapour phase at temperatures between about 200° to 650° C. and in the presence of a catalyst for said interaction, the improvement which comprises utilizing, as the catalyst, one consisting essentially of manganese, molybdenum, tellurium and oxygen.

2. The process of claim 1 wherein the contact time is between 0.5 and 10 seconds and from 1 to 10 parts of oxygen are used for each part by volume of olefin.

3. The process of claim 2 wherein from 2 to 10 parts of oxygen are used.

4. The process of claim 2 wherein from 4 to 10 parts of oxygen are used.

5. A process as claimed in claim 1 wherein the catalyst is deposited on a support.

6. A process as claimed in claim 1 where in the olefin is isobutene.

7. A process as claimed in claim 1 wherein the olefin is propene.

8. A process as claimed in claim 1 wherein the feed contains oxygen in the proportions of between 1 and 10 parts by volume of oxygen for each part by volume of the olefin.

9. A process as claimed in claim 8 wherein the feed contains oxygen in the proportions of between 4 and 10 parts by volume of oxygen for each part by volume of the olefin.

10. A process as claimed in claim 1 wherein the reaction is carried out in the presence of an inert gaseous diluent.

11. A process as claimed in claim 10 wherein the inert gaseous diluent is selected from the group consisting of nitrogen, steam, and mixtures thereof.

References Cited

UNITED STATES PATENTS

| 2,653,138 | 9/1953 | Middleton | 252—439 |
| 3,009,943 | 11/1961 | Hadley et al. | 260—604 |
| 3,065,264 | 11/1962 | Koch et al. | 260—533 |
| 3,098,102 | 7/1963 | Bethell et al. | 260—533 |

LORRAINE A. WEINBERGER, *Primary Examiner.*

LEON ZITVER, *Examiner.*

I. R. PELLMAN, S. B. WILLIAMS, *Assistant Examiners.*